Patented Apr. 5, 1932

1,852,945

UNITED STATES PATENT OFFICE

JOSEPH W. THROPP, OF TRENTON, NEW JERSEY

REBOUND CLAMP

Application filed November 18, 1930. Serial No. 496,488.

This invention relates to clamping devices and has for its object the provision of a novel rebound clamp adapted particularly for use with a weighted lever arm, such as the actuating lever for brake apparatus of the type disclosed in my Patent No. 1,621,442, dated March 15, 1927. Such a lever is gravitally operated to apply or operate the brake apparatus, which functions to stop the particular machine with which it is associated. The lever has a natural and inherent tendency to rebound upon reaching the lower limit of its downward motion, thereby causing undesirable unsteady application of the brake. The undesirability of this tendency to rebound is obvious, the chief objection being that the machine is not stopped as quickly as would otherwise be the case if the brake were unsteadily and continuously applied. The importance of stopping the machine quickly, especially in cases of emergency is, of course, apparent.

A device provided in accordance with the invention prevents this inherent action of the lever by clamping it firmly immediately upon its reaching the lower limit of its motion. Such a device may comprise a unitary clamp of simple construction, which may be pivotally mounted and adapted to be actuated by the lever in its downward motion. The simplicity of the device is a very important feature of the invention.

Figure 1:
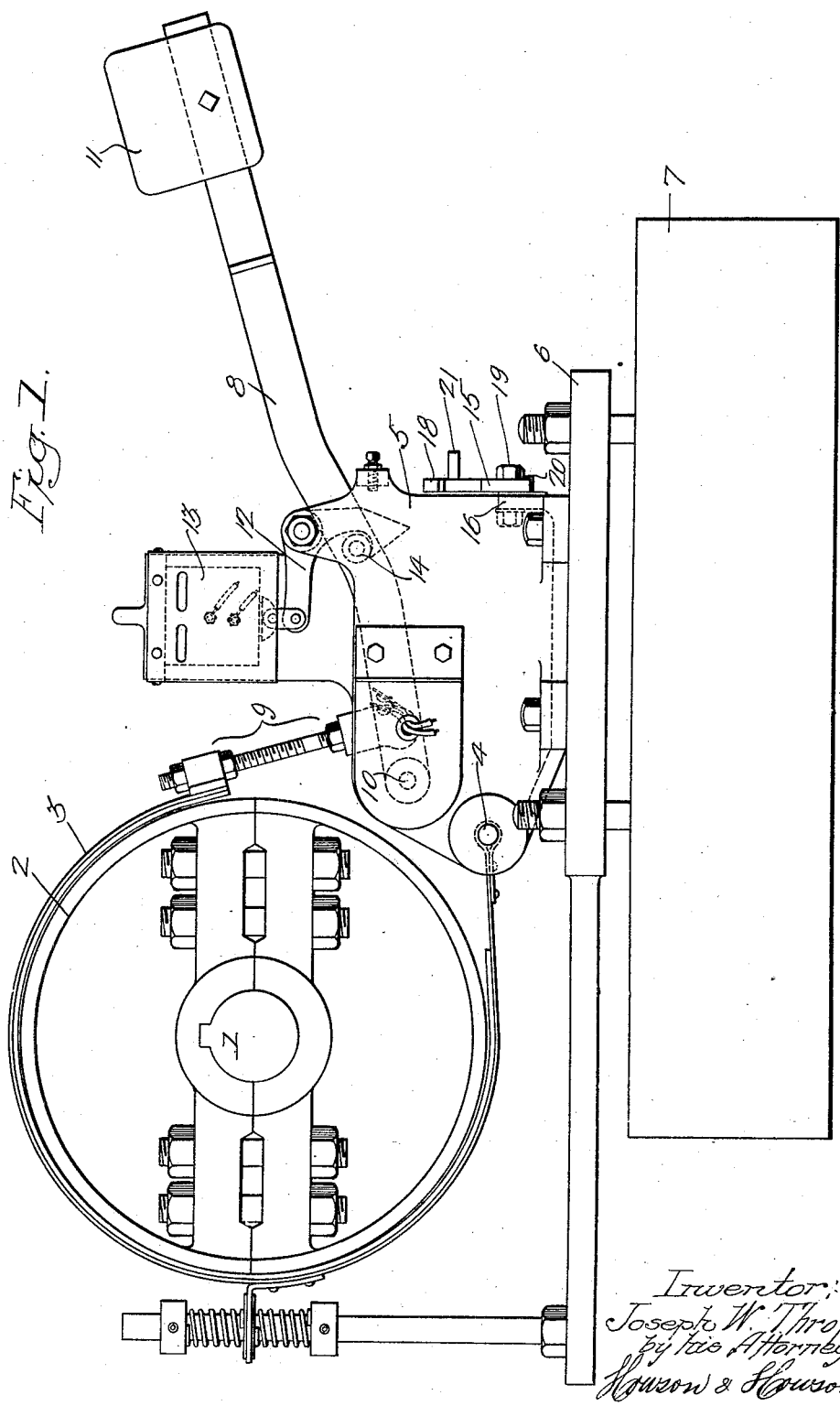
Figure 2:
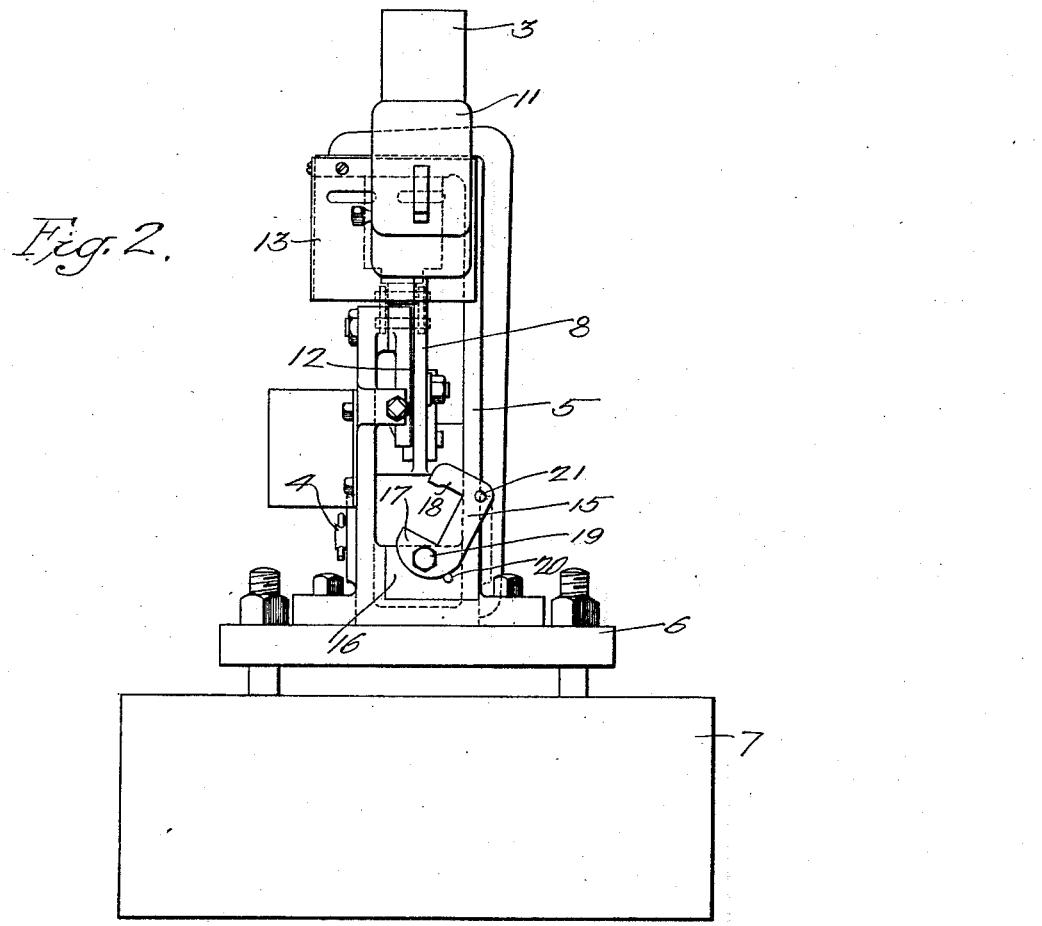

The details of construction of the device of the invention, as well as its manner of operation, will be apparent from the following detailed description taken in connection with the accompanying drawings, in which Fig. 1 is a side elevation of the brake apparatus to which the device of the invention is particularly adapted; and Fig. 2 is an end elevation of the apparatus of Fig. 1.

I have chosen to illustrate the invention as applied to brake apparatus similar to that disclosed in the above-mentioned patent and described therein as being associated with a rubber mixing machine. However, it will be understood that the device provided by the invention is susceptible of use with any brake apparatus with which it is adapted to be used, regardless of the type of machine with which the brake is associated.

Referring to the drawings, and particularly to Fig. 1 thereof, there is shown a power shaft 1 which may be the shaft of any machine with which the apparatus is associated. It will be understood, of course, that the power for driving the said machine and shaft 1 may be derived from any suitable source, such for example, as a mechanically connected electric motor. A brake drum 2 is mounted upon shaft 1, and has associated therewith a suitable brake band 3. One end of the brake band is fastened to pin 4, which, in turn, is rigidly carried by the walls of the supporting device 5. The support 5 comprises a pair of parallel vertical walls, and is mounted upon a base plate 6. The plate 6 may, in turn, be mounted upon a block 7, which may be supported upon the bed plate of the machine with which the apparatus is used. The other end of the brake band 3 is attached to a suitable brake-actuating lever 8 by means of an adjustable block and bolt mechanism 9 of known design. The brake-actuating lever is pivotally supported at one end upon a pin 10, which may be suitably journaled in the vertical walls of support 5. An adjustable weight 11 is provided upon the other end of lever 8, and it will be apparent that the purpose of such weight is to carry the lever downward to apply the brake band to the brake drum to stop rotation of shaft 1.

For the purpose of normally holding the brake actuating lever in raised position, to thereby normally maintain the brake inoperative, a solenoid-operating latch 12 may be provided. This latch and its associated structure forms no part of the present invention, but is disclosed and claimed in co-pending application, Ser. No. 496,489 filed Nov. 18, 1930. As clearly set forth in that application, the latch is pivotally mounted upon support 5 and is connected to the armature of a solenoid 13, which may also be carried by the support. For the purpose of the present invention, it suffices to state that solenoid 13 is normally energized and functions to maintain the latch 12 in operative position, as shown clearly in Fig. 1. The brake apparatus is rendered operative by deenergizing the solenoid, thereby permitting the latch to swing upon its pivot and to become disengaged from a roller 14 carried by lever 8. Weight 11 then forcibly carries the lever arm downward to apply the brake.

In accordance with the present invention, to overcome and prevent the inherent rebounding action of lever 8 previously mentioned, I provide a rebound clamp 15 which may be mounted upon an upstanding end wall 16 of support 5. This clamp preferably takes the form of a unitary U-shaped device having a pair of extending arms 17 and 18. As clearly illustrated, the recess of the clamp is dimensioned so that it will snugly receive lever 8. The clamp is pivotaly mounted at 19, and it will be apparent that this point is offset from the center of gravity of the device. Therefore, the clamp will have a tendency to rotate due to its own weight. To maintain the clamp in the desired normal position, I provide a pin 20 upon the wall of support 5 to act as a stop for the device, as clearly shown in Fig. 2. To facilitate manual operation of the clamp for the purpose of resetting the same, I also provide an extending pin or handle 21 upon the device. Obviously, this handle member may take the form of a threaded pin adapted to be screwed into a tapped opening in the clamp. The upper arm 18 of the clamp is preferably formed so as to be slightly hook shaped to insure positive gripping and holding of the brake-actuating lever.

Considering the operation of the device, let it be assumed first that the brake apparatus is in inoperative position, as shown in the figures of the drawings. The clamp is then disposed in the position shown clearly in Fig. 2. It will be noted that the lower arm 17 of the clamp lies directly in the path of the brake-actuating lever. Assume now that the machine is shut down and the brake applied by energizing the solenoid 13, as mentioned above. The brake-actuating lever will now move forcibly downward and upon reaching the lower limit of its motion, it will strike the arm 17 of the clamp, thereby rotating the clamp counterclockwise. The upper arm 18 of the clamp will pass over the lever, and the device will thus grip the lever and prevent rebounding of the same. It is important to note that both the shape of the upper arm 18 of the clamp and also the fact that the lever rests upon the lower arm of the clamp prevents disengaging of the clamp from the lever arm when the device has once operated. The brake apparatus may be reset by manually lifting the weighted lever arm when it is desired to start the machine again and to render the brake inoperative. At the same time that the lever is raised, the clamp may be moved clockwise to the position shown in Fig. 2, to thereby release the lever and allow the same to be raised.

It will be apparent that my invention provides a device which is extremely simple in construction but which nevertheless performs a very important function in a highly efficient manner. Various changes in the construction of the device may, of course, be made and are contemplated by the invention, which is to be limited only as indicated by the scope of the appended claims.

I claim:

1. The combination with a weighted lever adapted to move downward under the influence of gravity, of a clamp adapted to be engaged by said lever in its movement, said clamp being recessed so as to snugly receive and hold said lever to prevent rebounding thereof.

2. The combination with a weighted lever adapted to move downward under the influence of gravity, of a pivotally supported U-shaped clamp adapted to be engaged by said lever in its movement, the recess of said clamp being so dimensioned as to snugly receive and hold said lever to prevent rebounding thereof, the pivotal point of said clamp being offset from the center of gravity thereof, whereby said clamp in its ineffective position is tiltably disposed with one arm in the path of said lever, and said lever engages said arm to move said clamp into its effective position.

3. The combination with a power shaft to be controlled and a source of power therefor, of a brake apparatus associated with said power shaft, a lever adapted to move under the influence of a force for actuating said brake apparatus, and a clamp adapted to be engaged by said lever in its movement, said clamp being recessed so as to snugly receive and hold said lever to prevent rebounding thereof.

4. The combination with a power shaft to be controlled and a source of power therefor, of a brake apparatus associated with said power shaft, a weighted lever adapted to move downward under the influence of gravity for actuating said brake apparatus, and a clamp adapted to be engaged by said lever in its movement, said clamp being recessed so as to snugly receive and hold said lever to prevent rebounding thereof.

5. The combination with a power shaft to be controlled and a source of power therefor, of a brake apparatus associated with said power shaft, a lever adapted to move under the influence of a force for actuating said brake apparatus, and a pivotally supported U-shaped clamp adapted to be engaged by said lever in its movement, the recess of said clamp being so dimensioned as to snugly receive and hold said lever to prevent rebounding thereof, said clamp in its ineffective position being tiltably disposed with one arm in the path of said lever, whereby said lever engages said arm to move said clamp into its effective position.

6. The combination with a power shaft to be controlled and a source of power therefor, of a brake apparatus associated with said power shaft, a weighted lever adapted to move downward under the influence of gravity for actuating said brake apparatus, and a pivotally supported U-shaped clamp adapted to be engaged by said lever in its movement, the recess of said clamp being so dimensioned as to snugly receive and hold said lever to prevent rebounding thereof, the pivotal point of said clamp being offset from the center of gravity thereof, whereby, said clamp in its ineffective position is tiltably disposed with one arm in the path of said lever, and said lever engages said arm to move said clamp into its effective position.

JOSEPH W. THROPP.